US008307431B2

(12) United States Patent
Krishnamurthy et al.

(10) Patent No.: US 8,307,431 B2
(45) Date of Patent: Nov. 6, 2012

(54) METHOD AND APPARATUS FOR IDENTIFYING PHISHING WEBSITES IN NETWORK TRAFFIC USING GENERATED REGULAR EXPRESSIONS

(75) Inventors: Balachander Krishnamurthy, New York, NY (US); Oliver Spatscheck, Randolph, NJ (US); Jacobus Van Der Merwe, New Providence, NJ (US); Anirudh Ramachandran, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1031 days.

(21) Appl. No.: 12/156,341

(22) Filed: May 30, 2008

(65) Prior Publication Data

US 2009/0300768 A1    Dec. 3, 2009

(51) Int. Cl.
*G06F 11/00* (2006.01)
(52) U.S. Cl. ............................... 726/22; 726/26
(58) Field of Classification Search .................. 726/26, 726/22–25; 706/10, 14, 16; 709/225, 228, 709/224; 713/188
See application file for complete search history.

(56) References Cited

U.S. PATENT DOCUMENTS

| 6,321,267 | B1 | 11/2001 | Donaldson |
| 7,257,564 | B2 | 8/2007 | Loughmiller et al. |
| 7,366,761 | B2 | 4/2008 | Murray et al. |
| 2008/0082662 | A1* | 4/2008 | Dandliker et al. ............ 709/225 |
| 2008/0172741 | A1* | 7/2008 | Reumann et al. ............... 726/23 |
| 2009/0193126 | A1* | 7/2009 | Agarwal et al. ............... 709/228 |

OTHER PUBLICATIONS

Phishing Protection: Server Spec, downloaded from http://wiki.mozilla.org/Phishing_Protection:_Server_Spec on May 29, 2008.
ITA Networks, downloaded from http://www.itanetworks.com/PDF/Datasheet_ITA_EEE.pdf on May 29, 2008.
ThomasNet, downloaded from http://news.thomasnet.com/fullstory/538719 on May 29, 2008.
SpoofGuard, downloaded from http://crypto.stanford.edu/SpoofGuard/ on May 29, 2008.
Client-Side Defense Against Web-Based Identity Theft, downloaded from http://crypto.stanford.edu/SpoofGuard/webspoof.pdf on May 29, 2008.
Modeling and Preventing Phishing Attacks, downloaded from http://www.informatics.indiana.edu/markus/papers/phishing_jakobsson.pdf on May 29, 2008.

* cited by examiner

*Primary Examiner* — Samson Lemma

(57) ABSTRACT

According to an aspect of this invention, a method to detect phishing URLs involves: creating a whitelist of URLs using a first regular expression; creating a blacklist of URLs using a second regular expression; comparing a URL to the whitelist; and if the URL is not on the whitelist, comparing the URL to the blacklist. False negatives and positives may be avoided by classifying Internet domain names for the target organization as "legitimate". This classification leaves a filtered set of URLs with unknown domain names which may be more closely examined to detect a potential phishing URL. Valid domain names may be classified without end-user participation.

12 Claims, 4 Drawing Sheets

METHOD AND APPARATUS FOR IDENTIFYING PHISHING WEBSITES IN NETWORK TRAFFIC USING GENERATED REGULAR EXPRESSIONS

BACKGROUND OF THE INVENTION

"Phishing" refers to attempting to fraudulently acquire sensitive information, such as passwords and credit card details, by spoofing web pages of legitimate organizations. Phishing usually involves reproducing in "look and feel" a legitimate web page—such as that of a bank—on a server under the control of an attacker. The victim enters personal information on the webpage, believing the webpage to be trusted, and that information is harvested by the attacker for fraudulent use. Financial organizations and their current or potential customers may lose billions of dollars as phishers perfect schemes of obtaining personal information. Some of these schemes include international domain name spoofing, open URL redirectors, and embedded frames, all of which can make a phishing website visually indistinguishable from a legitimate one. While phishing communications can be sent indiscriminately in the hopes that a recipient will respond, recent more sophisticated phishing techniques have involved targeting individual recipients; for example, sending customers of a particular bank a webpage that looks like the webpage of the bank that they use. This targeted phishing technique is known as "spear phishing", and of course is much more effective than indiscriminate phishing.

Current phishing prevention methods are neither complete nor sufficiently responsive. Many phishing websites either go unnoticed completely or at least for a long enough period of time to do considerable damage. A major weakness in current phishing prevention methods is their dependence on user reports and manual updates. Many methods also require client-side software, which implicitly assumes—usually incorrectly—that end-users are aware of the dangers of phishing.

Many schemes to detect and prevent phishing have been proposed over the past few years, yet phishing-related losses incurred by victim organizations and their customers or potential customers continue to mount. A recent report estimates over 2.8 billion dollars of losses from phishing attacks in 2006 alone. The rise in the frequency and financial cost of phishing attacks results from both the increasing cleverness of phishers, (e.g., targeting more organizations, using sophisticated techniques to make the phishing website appear legitimate), and the ignorance of the typical Internet user concerning the dangers of phishing. Phishers are able to reach a larger population of end-users through spam email, instant messages, messages purported to be from friends ("spear phishing"), etc., where many users may not even be aware of the threat of phishing.

Current proposals to detect and mitigate phishing fall into three classes: 1) client-side solutions; 2) client-server solutions; and 3) server-side solutions. "Client-side solutions" are the most common among anti-phishing tactics. Many of these solutions are available as Web browser "plug-ins". Current methods include a) prominently alerting a user that a URL domain is fraudulent, b) performing various checks on the URL and the content of a Web page and raising alarms on suspicious web accesses, and c) modifying a password that is submitted to a site as a function of the site's domain name so that the password submitted to a phishing site is not the same as the one submitted to the legitimate site. Tools that analyze email and detect potential phishing URLs (e.g., by raising an alert for HTML email if the text and the URL for a hyperlink do not match) are also client-side solutions.

"Client-server solutions" include all techniques that involve a database back-end, such as a URL blacklist, are also quite common. This solution type also includes "blackbox" security appliances sold by vendors that are used to filter URLs. Additionally, external reputation sources, such as search engines from which information about URLs are retrieved, also belong to this category. Studies show that although many blacklist-based schemes have high accuracy rates, they are lacking in that they are neither complete in their listing of phishing URLs, nor are they sufficiently responsive in the timely detection of phishing URLs.

"Server-side solutions" include attempts by the targeted organization to increase user awareness of phishing, such as placing a visual cue system on valid Internet web pages. Such methods often fail as users are less likely to notice the absence of a visual indicator than its presence.

Some limitations of the prior art can be seen by examining the construction of "blacklists", a common anti-phishing technique. Blacklist construction of URLs is commonly made from user reports; therefore, it is an inherently reactive approach. Dependence on user reports makes a timely response to phishing attacks challenging, if not impossible. Before a phishing URL is reported, verified, and listed, many users may have already fallen prey to the attack. Many of these blacklists also list the complete URL of the phishing site, allowing even minor variants of the same phishing URL to escape listing. Additionally, phishers could poison the blacklist by submitting valid domain names to the blacklist. Worse yet, even if current techniques could be improved, they are inherently client-based. They require users to install toolbars and other client software and act appropriately in response to warnings. Unfortunately, most users do not realize the need for phishing protection, and do not install client-based anti-phishing tools.

By analyzing the current phishing prevention landscape, at least four limitations may be identified. These limitations are: 1) a lack of responsiveness, 2) a lack of completeness, 3) a need for end-user cooperation to install and use the anti-phishing technique, and 4) a reaction-based approach primarily utilizing historical data to fight phishing attacks.

Lack of responsiveness comes from the slow detection of new phishing URLs. Historical data has shown that the half-life of a phishing site is of the order of a week or less. Therefore, the inherent delay between when a phishing website is established until sufficient user feedback is received to validate adding the site to a blacklist of known phishing URLs makes it difficult to properly guard against phishing attacks.

Lack of blacklist completeness comes from a lack of end-user feedback regarding phishing attacks, since blacklists are generated from such feedback. This lack of completeness of blacklists is due to a lack of end-user awareness or appreciation of the phishing problem.

Lack of end-user awareness also leads to a lack of end-user participation in utilizing anti-phishing techniques. The end-users will be slow in loading anti-phishing software on their computers and will usually not pay proper attention to anti-phishing warnings.

Lack of a proactive approach and reliance on historical data to fight phishing attacks leads to significant periods of time between when the phishing website is established until it placed onto a blacklist. This period of time gives phishers ample time to cause significant damage.

Accordingly, what is needed is a method that addresses these limitations in protecting against phishing.

BRIEF SUMMARY OF THE INVENTION

In accordance with an aspect of the invention, these limitations are avoided by: creating a whitelist of URLs using a first regular expression; creating a blacklist of URLs using a second regular expression; comparing a URL to the whitelist; and if the URL is not on the whitelist, comparing the URL to the blacklist.

In accordance with another aspect of the invention, these limitations are avoided by determining, using a first regular expression for identifying a legitimate Internet domain name, whether a domain name of a URL associated with network traffic matches a legitimate Internet domain name of a target organization; classifying the network traffic containing the URL as legitimate if the URL's domain name matches the legitimate Internet domain name; and if the URL is not classified as legitimate, quantifying how closely the URL matches a second regular expression for identifying an unacceptable URL of the target organization.

The limitation of a lack of completeness and accuracy which leads to false negatives and false positives may be avoided by classifying Internet domain names for the target organization as "legitimate". This classification leaves a filtered set of URLs with unknown domain names which may be more closely examined to detect a potential phishing URL. The limitations of a lack of end-user awareness and a delay in end-user feedback are removed since the classifying of valid domain names may be performed without end-user participation.

In an embodiment of the invention, a matching score is determined for a piece of network traffic that is not classified as legitimate. The matching score may quantify how closely a URL contained in the piece of network traffic matches a regular expression for identifying an unacceptable URL.

A regular expression for identifying an unacceptable URL may be comprised of at least one common structure found in a legitimate URL for a domain name of the target organization; but just allowing the location of the structure in the URL to vary. Alternatively, a regular expression for identifying an unacceptable URL comprises at least one structure which closely matches a structure in a legitimate domain name for the target organization. The limitation of a lack of a timely response may be avoided with these regular expressions. These regular expressions search for structures without any end-user participation, and can match against future phishing URLs, not just existing ones.

In a further embodiment of the invention, a function is performed when the piece of network traffic that is not classified as legitimate has a matching score above a first predetermined matching score, and perhaps below a second predetermined matching score. The function performed may be to prevent the network traffic from reaching its destination, or, at least, to delay the network traffic from reaching its destination to allow for further investigation. Alternatively, the network traffic may be allowed to reach its destination without substantial delay, but with an indication that a URL in the network traffic may be unacceptable. An end-user may be the recipient of this indication.

When an end-user is the recipient of the notification, rather than, for example, a network administrator, a further embodiment of the invention involves receiving a response from the end-user. Depending on the end-user's indication, the URL previously deemed to be unacceptable may be kept with that classification or may be reclassified as a legitimate URL. When the URL is reclassified as a legitimate URL, the domain name from the URL may be added to a set of legitimate Internet domain names. An indication from the end-user may be passive or active. A passive indication may be an end-user's action of clicking-through to activate an HTTP request for the URL. An active indication may be an end-user's response to a graphical user interface (GUI) which requests his assessment of the legitimacy of the piece of network traffic and the URL contained within it.

In an embodiment of the invention, a legitimate Internet domain name is a domain name registered to one of the following: a) the target organization, b) an approved advertising organization, and c) an approved Internet search organization. Various parties—such as a system administrator, an end-user, or a representative of the target organization—may designate which advertising organizations and Internet search organizations are given an "approved" status. Additionally, a legitimate Internet domain name may be determined based on a) historical data or b) experimental data.

These and other advantages of the invention will be apparent to those of ordinary skill in the art by reference to the following detailed description and the accompanying drawings.

DETAILED DESCRIPTION

Figure 1:
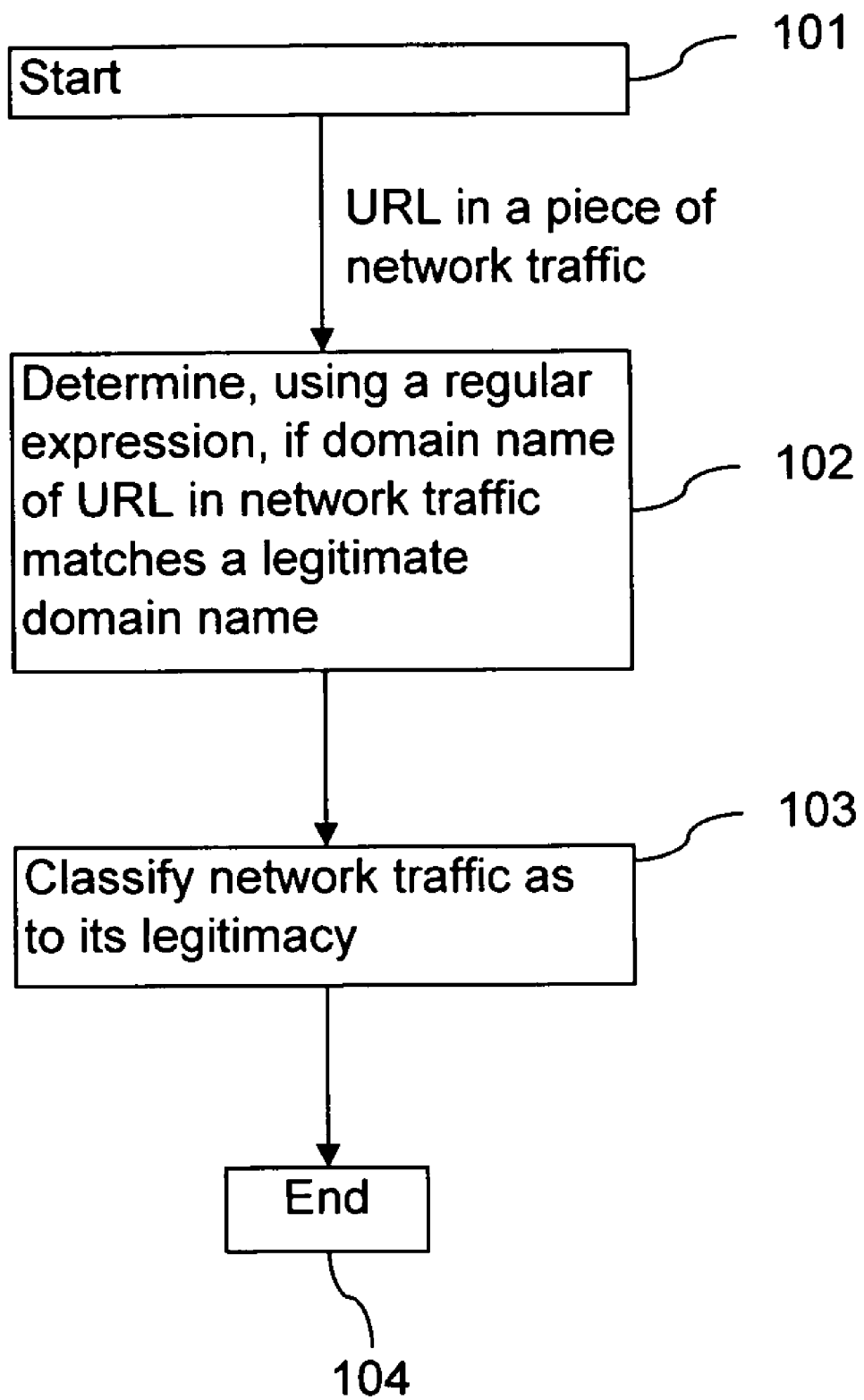
FIG. 1 is a flowchart for illustrating a method for classifying network traffic.

Phishing attacks involve the imitation of web pages of legitimate organizations in order to steal user identities. Financial organizations and users may lose billions of dollars as phishers perfect schemes such as internationalized domain name spoofing, open URL redirectors, and embedded frames, all of which can make a phishing site visually indistinguishable from a legitimate one. While there is an urgent need to stop this form of identity theft, current phishing prevention methods are neither complete nor appropriately responsive. Many phishing websites go undetected. Even when phishing websites are detected, there is often a substantial lag time between when the site is first established until it is detected, thus providing the phishers with sufficient time to do their damage. Additionally, in order for most of the current phishing prevention methods to work, end-user intervention is necessary. This is a challenge since many end-users are not even aware of or do not fully appreciate the risks associated with phishing attacks.

Large-scale phishing prevention primarily relies on constructing "blacklists" of URLs from end-user reports. This reactive approach makes timely response to an attack challenging, if not impossible. Before a phishing URL is reported, verified, and listed, many users may have already fallen prey to the attack. Furthermore, many of these blacklists only list the complete URL of the phishing site, allowing even minor variants of the same phishing URL to escape identification. Worse yet, even if current techniques could be improved, many are inherently client-based. They require users to install toolbars or other client software and to act appropriately in response to warnings. Unfortunately, many users do not realize or fully appreciate the need for phishing protection, and therefore, do not install client-based anti-phishing tools.

By analyzing the current phishing prevention landscape, at least four limitations may be identified. These limitations are: 1) a lack of responsiveness, 2) a lack of completeness, 3) a need for end-user cooperation to install and use the anti-phishing technique, and 4) a reaction-based approach primarily utilizing historical data to fight phishing attacks.

In accordance with an aspect of the invention, these limitations are avoided by: determining, using a first regular expression for identifying a legitimate Internet domain name, whether a domain name of a URL associated with network traffic matches a legitimate Internet domain name of a target organization; classifying the network traffic containing the URL as legitimate if the URL's domain name matches the legitimate Internet domain name; and if the URL is not classified as legitimate, quantifying how closely the URL matches a second regular expression for identifying an unacceptable URL of the target organization.

The limitation of a lack of completeness and accuracy which leads to false negatives and false positives may be avoided by classifying genuine Internet domain names for the target organization as "legitimate". This classification leaves a filtered set of URLs with unknown domain names which may be more closely examined to detect a potential phishing URL. The limitations of a lack of end-user awareness and a delay in end-user feedback are removed since the classifying of valid domain names may be performed without end-user participation.

FIG. 1 is a flowchart illustrating a method for classifying network traffic. The method begins at step 101. A domain name for at least one target organization may already be known from an "off-line" collection of information, and is therefore not presented as a step in the current method, which is describing real-time classification of network traffic. Such an offline collection of information might include a explicit URL protection service. The domain name information may be collected from the target organization directly. Alternatively, the domain name information may be collected by looking at lists of trusted registered domain names. A whitelist of one or more legitimate domain names for one or more target organizations may be generated. A legitimate domain name may, for example, be a domain name registered to: a) the target organization; b) an "approved" advertising organization; c) an "approved" web searching organization.

A legitimate domain name may also be a domain name observed to be safe based on experimental studies or on historical observations or data. For example, historical statistical records may be maintained relating to activities of servers associated with a given domain name. In one embodiment, the historical statistical records may relate to clients who have interacted with the given domain name. The domain name may be tested as being safe by analyzing the structure of a web page associated with the domain name. Specifically, the structure of the web page may be analyzed by further analyzing domains that are pointed to by URLs embedded in the web page.

The method continues at step 102 by determining, using a "regular expression", if a domain name of URL found in a piece of network traffic matches a legitimate Internet domain name. Some examples of network traffic include: emails stored in an email server, email traffic observed during transport to and from a server, an HTTP click stream (i.e. an activated request for a certain web page) and subsequent response, and a domain name lookup request and subsequent response. A "regular expression" is a text string used to describe a search pattern. The methodology of regular expressions are well known to those having ordinary skill in the art.

The difference between a domain name and a URL is illustrated below:
URL: "http://www.foo.com/coolpic.gif"
Domain name: "www.foo.com"

The URL is simply a formatted string and consists of three parts: the protocol for communicating with the server (e.g., http); the name of the server (www.foo.com); and the resource identifier—the name of the resource at that server (e.g., coolpic.gif). ".com" is the top-level domain, while www.foo.com is the fully qualified domain name.

Identifying a URL in a piece of network traffic may be achieved in different ways. Detection of a URL in email stored on an email server requires analyzing the email server's storage device for any stored URL associated with the particular email. The detection of a URL in email traffic during transport to and from a server, in an HTTP click stream, or in Domain Name System (DNS) lookup requires looking into data packets containing the data which comprise the piece of network traffic. Investigating the contents of data in the packet may be accomplished using a method of deep-packet inspection. This inspection may be performed at a firewall in the network that is appropriately equipped to perform deep-packet inspection. Alternatively, network traffic may be investigated at any point along a network equipped to perform deep-packet inspection.

Regular expressions are used to determine if the domain name of the URL matches a legitimate domain name. The regular expression string is used to describe or match a set of strings, according to certain syntax rules. In this description, a regular expression may be a string that is used to search a body of text based on certain text patterns in the body of text. Usage of regular expressions in various embodiments of the invention is further described in FIG. 2 which will be discussed below.

The method continues at step 103 where the piece of network traffic is classified according to its legitimacy. The network traffic is said to be "legitimate" if the domain name of the URL found in the piece of network traffic was determined, in step 102, to match a legitimate Internet domain name. If no match was made in step 102, then the network traffic is not classified as "legitimate".

One goal of classifying network traffic as "legitimate" is to facilitate filtering out pieces of network traffic with URLs containing legitimate domain names. This filtering minimizes false positives by allowing for a subsequent, more careful inspection of URLs in the remaining pieces of network traffic which are not classified as "legitimate". A false positive may occur when a legitimate URL in a piece of network traffic is classified as being an "unacceptable URL". An "unacceptable URL" may be a "phishing" URL.

To further reduce false-positives the whitelist for legitimate domain names may also include some popular domain names. Some examples of popular domain names include domain names for advertising organizations known to advertise the target organization, and a domain name for an Internet search organization known to locate the target organization in a relevant query. These popular domain names may contain parts of the target organization's domain name in their own URLs, and therefore, come up as false positives in a search that uses a regular expression which looks for phishing URLs which closely match the target organization's URLs.

Additionally, domain names that may be added to a list of legitimate Internet domain names for the target organization include a) a historically-observed-to-be-safe web page, b) a research-tested-to-be-safe web page, and c) a legitimate web page likely to be incorrectly identified as phishing web pages for the target organization.

The method of this embodiment ends at step 104, after the piece of network traffic has been either classified as "legitimate" or not classified as "legitimate".

Figure 2:
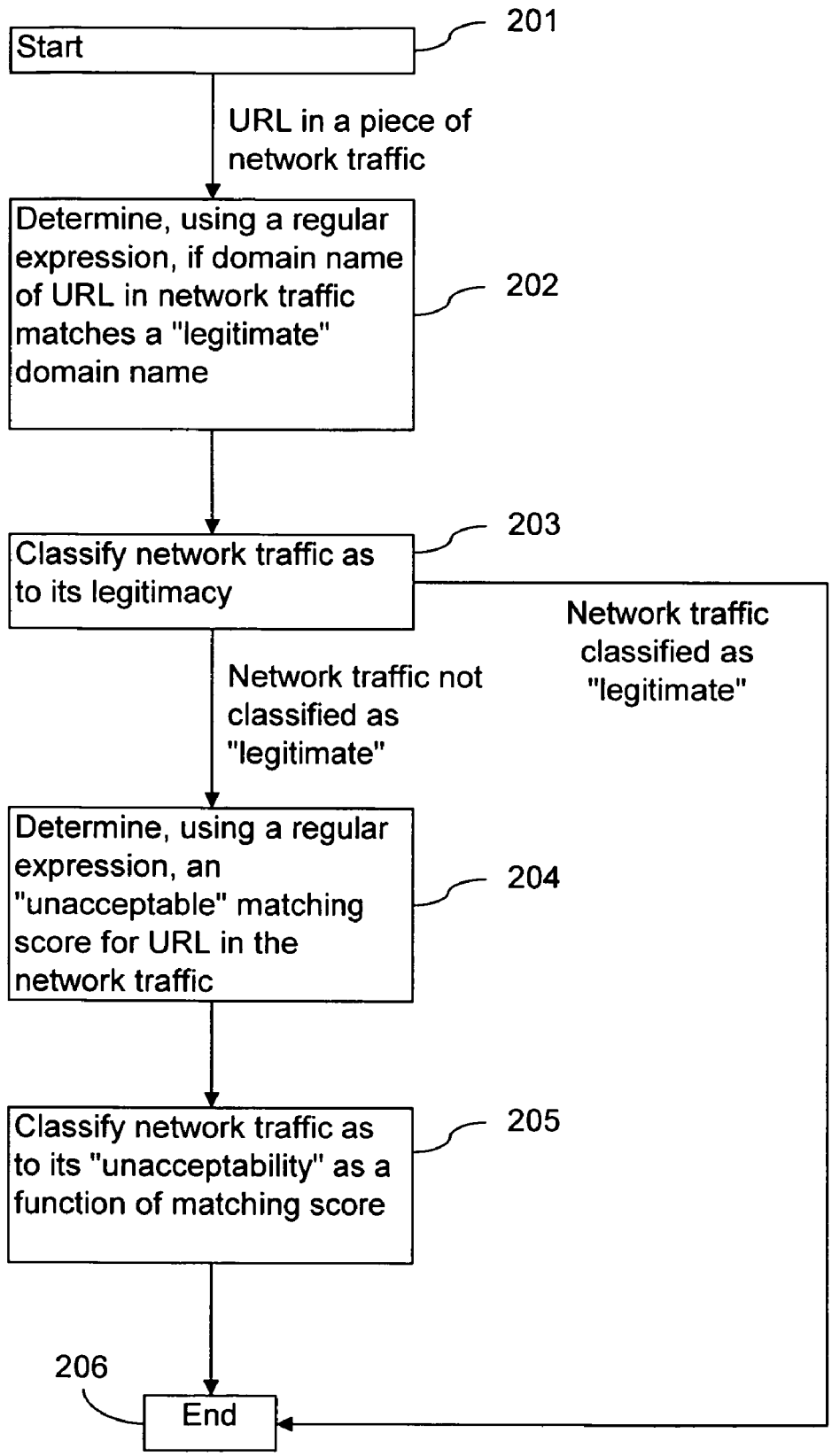
FIG. 2 is a flowchart for illustrating a two-stage method for classifying network traffic.

FIG. 2 is a flowchart illustrating a two-stage method for classifying network traffic. Steps 201 to 203 correspond to steps 101 to 103 in FIG. 1. If the network traffic is classified as "legitimate", then the method ends at step 206. However, at step 204, network traffic not classified as "legitimate" is further analyzed. In this embodiment, a regular expression is used to determine a matching score for the entire URL in the piece of network traffic, not just the domain name. The matching score quantifies how closely a URL contained in the said network traffic that is not classified as "legitimate" matches a regular expression for identifying an "unacceptable" URL. An "unacceptable" URL may be a URL that is likely to be a phishing URL.

The construction of regular expressions may focus on prominent structures of phishing URLs. These prominent structures may be dictated by input from the target organization. Alternatively, these prominent structures may be learned by observing how historical phishing attacks have been set up for a specific target organizations or a set of target organizations. One way phishers do this is by pre-pending the domain name of a phishing URL with a domain name for the target organization, such as "http://signin.ebay.com.910462.phishsite.com". The target organization's domain name is "signin.ebay.com" and the phishing URL is "910462.phishsite.com". Alternatively, phishers place the target organization's domain name in the resource identifier portion of the URL, e.g. "http://phishsite.com/signin.ebay.com". Another alternative is to use the target organization's domain name, except to misspell the domain name slightly, e.g. http://www.ebbay.com". This type of phishing attack may be referred to a "typo-squatting".

The current invention, in one embodiment, focuses on constructing regular expressions that identify phishing URLs that utilize these methods of imitating a target organization's domain name. The regular expressions for identifying a phishing URL are used on all URLs that do not contain a domain name that was classified as legitimate in step 203. Unlike the regular expressions for identifying legitimate domain names, these regular expressions check both parts of a URL—the domain name and the resource identifier—for similarity with each target organization's URL. In this embodiment, it is assumed that the closer a URL appears to the target organization's URL, the more likely it is a phishing URL. The score for detecting phishing attacks using URL structures may be defined as follows. The URL's score is the number of matched clauses in the blacklist regular expression corresponding to that URL. URLs that more closely match a blacklist regular expression will receive a higher score. An example of a simplified version of a regular expression that looks for EBay phishing in the domain name of a URL is as follows:

(signin|cgi|secure)?(.?)(EBay)(.?)(com)?.+(:\\d+)?

For the sake of illustration, two URLs that would match this regular expression are:
1. "ebay.doubleclick.net"
2. "signin.ebay.com.phishsite.com"

The second URL matches more clauses in the regular expression and will receive a higher score, even if nothing was known about the legitimacy of either domain.

Another example of a regular expression is one that is made to catch typo-squatting. However, such a regular expression—while very effective at detecting typo-squatting phishing URLs—is not practical in the background art. The reason is because this regular expression would come up with many false positive results, since valid Paypal URLs would be identified with this regular expression. However, in this embodiment of the invention, such a regular expression is very practical. Since all or most of the legitimate domain names for Paypal are classified as legitimate and removed from the analysis, any URLs identified by this regular expression is likely a phishing URL.

Some advantages of this aspect of the invention are as follows. First, this proactive method does not require user participation cooperation. In contrast to existing reactive phishing prevention techniques such as blacklisting based on previous phishing attacks, the method in this embodiment of the invention is proactive. It may detect a phishing URL which closely matches a target organization's URL without any end-user feedback. Second, the regular expressions can be used to detect, and protect against, future phishing URLs, not just existing ones. Third, once the phishing attack is detected, all users may be protected against it, irrespective of their client software. This is because a regular expression can be generated which matches the identified phishing URL. This regular expression may then be implemented, for example, by a system administrator on all pieces of network traffic that enters a local network. Fourth, in-network analysis and mitigation may be applied anywhere along the network path. By proactively testing network traffic to detect phishing attacks, this method departs from current reactive methods, such as creating blacklists based on end-user feedback concerning problematic web pages or emails. Fifth, a more careful investigation of URLs is possible, since legitimate domain names are classified and removed from the analysis.

Step 205 involves classifying network traffic as to its "unacceptability" as a function of matching score. If a URL in the piece of network traffic is flagged as being "unacceptable" and therefore potentially a phishing URL, then the network traffic is classified as "unacceptable". If the URL is not flagged as being "unacceptable", then the network traffic is not classified as "unacceptable". In either case, this embodiment ends at step 206.

In a specific embodiment of the invention, a function is performed when the piece of network traffic that is not classified as legitimate has a matching score above a first predetermined matching score, and perhaps below a second predetermined matching score. The function performed may be to prevent the network traffic from reaching its destination, or, at least, to delay the network traffic from reaching its destination to allow for further investigation. In one embodiment the network traffic goes through a proxy that blocks the traffic or a response to the traffic based on the score. Alternatively, the network traffic may be allowed to reach its destination without substantial delay, but with an indication that a URL in the network traffic may be unacceptable. An end-user may be the recipient of this indication.

Figure 3:
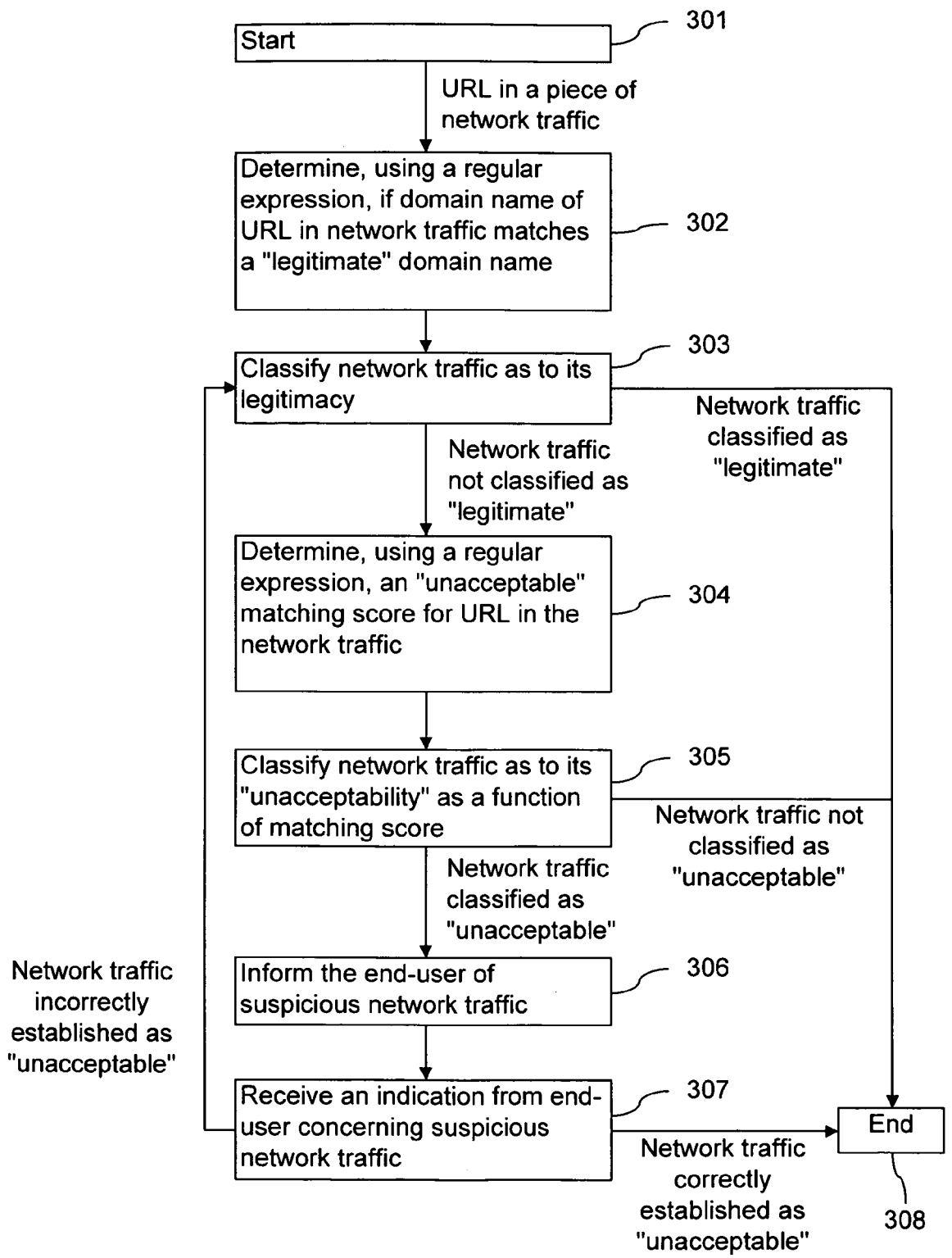
FIG. 3 is a flowchart for illustrating use of an end-user indication regarding results from the two-stage method for classifying network traffic.

FIG. 3 is a flowchart illustrating receiving an end-user indication regarding results from the two-stage method for classifying network traffic. Steps 301-305 match steps 201-205 in FIG. 2. The processing of a piece of network traffic which is not classified as "unacceptable" in step 305 is completed at step 308. Step 306 involves informing the end-user that the network traffic may be "unacceptable" in that it contains a possible phishing URL. Alternatively, the network traffic may be eliminated before reaching the end-user, or at least significantly delayed in order to allow the suspicious URL to be further investigated.

At step 307, an indication is received from the end-user regarding the suspicious network traffic. If the end-user indicates that the URL in the network traffic has been incorrectly established as "unacceptable", the domain name from the URL may be added to the list of "legitimate" domain names in order to avoid the URL from being incorrectly established as "unacceptable" in the future. This step of the method helps to reduce false-positive results. The analysis proceeds back to step 303 where this piece of network traffic will now be classified as "legitimate". However, if no indication is received from the end-user regarding the network traffic, it may be assumed that the network traffic was correctly established as "unacceptable".

An indication from the end-user can be passive or active. A passive indication may be an end-user's decision to access the URL. An end-user's indication may be actively solicited by redirecting an end-user to a page that issues a warning concerning a URL found in the piece of network traffic. The page may prompt the end-user to give his assessment as to the legitimacy of the piece of network traffic and the URL contained in the piece of network traffic.

This embodiment has an advantage in reducing false positives. For example, it allows for an initial "seed" whitelist of legitimate domain names to be collected from various sources. Upon receiving an indication from an end-user that a questionable URL is indeed legitimate, a listing of legitimate domain names may be dynamically updated in order to reduce false positives. This embodiment also shares all of the advantages mentioned previously in the embodiments shown in FIG. 1 and FIG. 2. The process in this embodiment ends at step 308.

Some alternatives to the embodiments illustrated previously are now listed.

The step of identifying a legitimate Internet domain name for a target organization may be performed in real-time as the first step in generating a regular expression for detecting a) a legitimate Internet domain name, and/or b) an unacceptable URL.

In one embodiment, the phishing detection method may be made more accurate, thus producing less false positive results, by dynamically adding new target organizations. An initial "seed" group of target organizations primarily targeted by phishers may be selected. Additional target organizations may be added as new phishing patterns emerge. This updating process may be easily accomplished by writing a generic XML-based specification for organizations; the XML file may then be parsed to automatically generating both whitelist and blacklist regular expressions. For example, tags such as <domainname/> and <tld/>, which represent respectively the domain names and top-level domain (TLD) names that are legitimate for the organization. The entry may also contain a <blacklist/> tag, which enumerates some of the common structures found in phishing URLs for that organization domain (e.g., secure is commonly found in phishing URLs for Paypal such as "secure.paypal.com").

The XML representation is convenient for updates, allowing for minimal input for a new target organization in order to make regular expressions for creating a blacklist and whitelist. These inputs may be received from each target organization. Alternatively, each executer of this method could put in these inputs.

Figure 4:
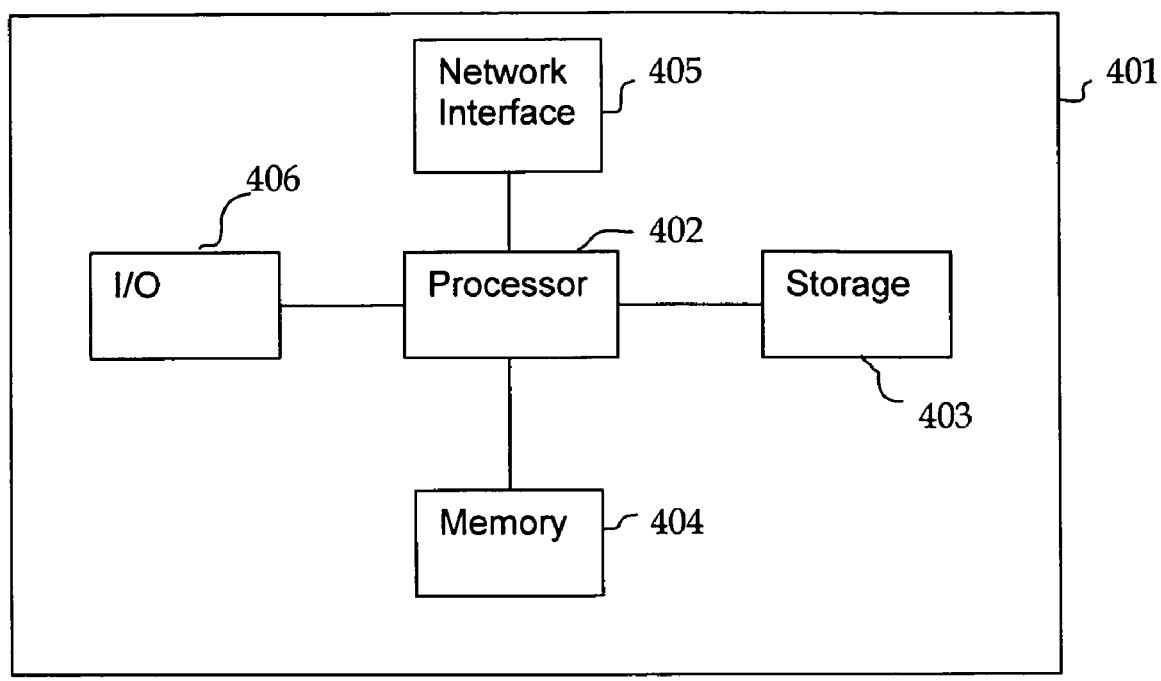
FIG. 4 is a schematic representation of a computer upon which the invention may be implemented.

A high level block diagram of a computer that may be used in implementing this invention is illustrated in FIG. 4. Computer 401 contains a processor 402 which controls the overall operation of the computer 401 by executing computer program instructions which define such operation. The computer program instructions may be stored in a storage device 403 (e.g., magnetic disk) and loaded into memory 404 when execution of the computer program instructions is desired. Thus, the method steps described herein can be defined by the computer program instructions stored in the memory 404 and/or storage 403 and executed by the processor 402. The computer 401 may also include one or more network interfaces 405 for communicating with other devices via a network. The computer 401 also includes input/output devices 406 that enable user interaction with the computer 401 (e.g., display, keyboard, mouse, speakers, buttons, etc.) One skilled in the art will recognize that an implementation of an actual computer could contain other components as well, and that FIG. 4 is a high level representation of some of the components of such a computer for illustrative purpose.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
   identifying by a network node a particular Internet domain name as a legitimate Internet domain name based on its being tested as safe;
   determining by the network node, using a first regular expression for identifying the legitimate Internet domain name, whether a domain name of a uniform resource locator associated with network traffic matches a legitimate Internet domain name of a target organization;
   classifying network traffic containing the uniform resource locator as legitimate if the uniform resource locator's domain name matches the legitimate Internet domain name;
   adding the domain name of the uniform resource locator associated with network traffic to a set of legitimate Internet domain names;
   if the uniform resource locator is not classified as legitimate, quantifying by the network node how closely the uniform resource locator matches a second regular expression for identifying an unacceptable uniform resource locator of the target organization, the second regular expression different from the first regular expression; and
   performing a function when network traffic that is not classified as legitimate matches the second regular expression for identifying an unacceptable uniform resource locator with a matching score greater than a first predetermined threshold, the function comprising delaying the network traffic from reaching its destination and transmitting an indication that the network traffic contains a uniform resource locator which may be an unacceptable uniform resource locator,
   wherein the particular Internet domain name is tested by the network node as being safe by analyzing a structure of a web page associated with the particular Internet domain name, the structure of the web page analyzed by analyzing a domain that is pointed to by a uniform resource locator embedded in the web page, and wherein the particular Internet domain name comprises a domain name registered to an approved advertising organization designated as approved by a representative of the target organization and an end user.

2. The method of claim 1 wherein the second regular expression comprises a structure found in a legitimate uniform resource locator of the target organization.

3. The method of claim 2 wherein the second regular expression comprises a structure which matches a structure in a legitimate uniform resource locator of the target organization with a matching score greater than a first predetermined threshold.

4. The method of claim 1 wherein the performing a function further comprises removing the network traffic from network circulation.

5. The method of claim 1 further comprising:
receiving an indication that the uniform resource locator which may be an unacceptable uniform resource locator should be classified as an acceptable uniform resource locator.

6. The method of claim 5 wherein the receiving the indication comprises receiving an indication that a receiver of the network traffic clicked-through the uniform resource locator.

7. The method of claim 1 further comprising:
identifying a particular Internet domain name as a legitimate Internet domain name based on its being historically observed to be safe.

8. The method of claim 7 wherein historical statistical records are maintained relating to activities of servers associated with a given domain name.

9. The method of claim 8 wherein the historical statistical records are related to clients who have interacted with the given domain name.

10. The method of claim 1, further comprising:
analyzing a packet associated with the network traffic using deep packet inspection.

11. An apparatus comprising:
means for identifying a particular Internet domain name as a legitimate Internet domain name based on its being safe;
means for determining, using a first regular expression for identifying the legitimate Internet domain name, whether a domain name of a uniform resource locator associated with network traffic matches a legitimate Internet domain name of a target organization;
means for classifying network traffic containing the uniform resource locator as legitimate if the uniform resource locator's domain name matches the legitimate Internet domain name;
means for quantifying how closely the uniform resource locator matches a second regular expression for identifying an unacceptable uniform resource locator of the target organization, if the uniform resource locator is not classified as legitimate, wherein the second regular expression is different from the first regular expression;
means for adding the domain name of the uniform resource locator associated with network traffic to a set of legitimate Internet domain names; and
means for performing a function when network traffic that is not classified as legitimate matches the second regular expression for identifying an unacceptable uniform resource locator with a matching score greater than a first predetermined threshold, the function comprising delaying the network traffic from reaching its destination and transmitting an indication that the network traffic contains a uniform resource locator which may be an unacceptable uniform resource locator,
wherein the particular Internet domain name is tested as being safe by analyzing a structure of a web page associated with the particular Internet domain name, the structure of the web page analyzed by analyzing a domain that is pointed to by a uniform resource locator embedded in the web page, and wherein the particular Internet domain name comprises a domain name registered to an approved advertising organization designated as approved by a representative of the target organization and an end user.

12. A non-transitory computer readable medium storing computer program instructions, which, when executed on a processor, cause the processor to perform a method comprising:
Identifying a particular Internet domain name as a legitimate Internet domain name based on its being tested as safe;
determining, using a first regular expression for identifying the legitimate Internet domain name, whether a domain name of a uniform resource locator associated with network traffic matches a legitimate Internet domain name of a target organization;
classifying network traffic containing the uniform resource locator as legitimate if the uniform resource locator's domain name matches the legitimate Internet domain name;
adding the domain name of the uniform resource locator associated with network traffic to a set of legitimate Internet domain names;
if the uniform resource locator is not classified as legitimate, quantifying how closely the uniform resource locator matches a second regular expression for identifying an unacceptable uniform resource locator of the target organization, the second regular expression different from the first regular expression; and
performing a function when network traffic that is not classified as legitimate matches the second regular expression for identifying an unacceptable uniform resource locator with a matching score greater than a first predetermined threshold, the function comprising delaying the network traffic from reaching its destination and transmitting an indication that the network traffic contains a uniform resource locator which may be an unacceptable uniform resource locator,
wherein the particular Internet domain name is tested as being safe by analyzing a structure of a web page associated with the particular Internet domain name, the structure of the web page analyzed by analyzing a domain that is pointed to by a uniform resource locator embedded in the web page, and wherein the particular Internet domain name comprises a domain name registered to an approved advertising organization designated as approved by a representative of the target organization and an end user.

* * * * *